United States Patent
Berger

[11] Patent Number: 6,105,211
[45] Date of Patent: Aug. 22, 2000

[54] BELT SHORTENING DEVICE

[75] Inventor: Russell Berger, Needham, Mass.

[73] Assignee: Constance F. Berger, Naples, Fla.

[21] Appl. No.: 09/506,167

[22] Filed: Feb. 17, 2000

Related U.S. Application Data

[63] Continuation-in-part of application No. 09/315,319, May 20, 1999, Pat. No. 6,047,451.
[51] Int. Cl.[7] .............................. A44B 21/00; B25B 25/00
[52] U.S. Cl. ........................ 24/68 SB; 24/909; 24/68 CD
[58] Field of Search .............................. 24/68 CD, 68 E, 24/269, 68 SB, 71.1, 71.2, 909; 254/213, 218; 410/97, 100, 103; 242/378.1, 378.2

[56] References Cited

U.S. PATENT DOCUMENTS

| | | | |
|---|---|---|---|
| 482,035 | 9/1892 | Buckingham | 24/909 X |
| 3,574,342 | 4/1971 | Berns | 24/68 CD X |
| 4,510,652 | 4/1985 | Van Iperen | 24/68 CD |
| 4,604,773 | 8/1986 | Weber et al. | 24/71.2 |
| 4,823,443 | 4/1989 | Waters | 24/68 CD |

*Primary Examiner*—Anthony Knight
*Assistant Examiner*—Robert J. Sandy
*Attorney, Agent, or Firm*—Barlow, Josephs & Holmes, Ltd.

[57] ABSTRACT

A belt shortening device for winding and unwinding a vehicle seat belt is disclosed. The device includes a spindle mounted in a frame and connected to a crank arm to facilitate winding. The spindle includes a longitudinally extending slot which communicates with a laterally extending entry opening. A seat belt, when folded, is insertable into the longitudinally extending slot via the laterally extending entry opening. Once the vehicle seat belt is positioned within the longitudinally extending slot, the crank arm is manipulated to, thereby, rotate the spindle to wind the belt therearound. The laterally extending entry opening is positioned substantially mid-way along the length of the longitudinally extending slot to prevent ejection and slippage of the belt during winding. Additional tabs are provided to hold the belt in place during winding.

7 Claims, 6 Drawing Sheets

BELT SHORTENING DEVICE

This application is a continuation-in-part of U.S. Ser. No. 09/315,319, filed May 20, 1999 now U.S. Pat. No. 6,047,451.

BACKGROUND OF THE INVENTION

This invention relates to a belt shortening device useful, for example, in tightening an automotive lap seat belt.

The known belt or strap shortening devices are typically overly complex and thus not suited for low cost manufacture. Moreover, such devices are not readily applicable to straps or belts that are either endless or that have buckles or the like that prevent threading through or around winding components. Thus, and particularly with respect to the automotive after market, there is a need for a low cost belt shortening device that can be readily applied to existing lap seat belts, thereby enabling the belts to be adequately tightened, for example, when securing a child's seat or the like in place on a vehicle seat.

SUMMARY OF THE INVENTION

A belt shortening device in accordance with the present invention includes a frame supporting a winding spindle which is rotatable by means of an operating arm. Spindle rotation is governed by ratchet mechanisms mechanically interposed between the operating arm and the spindle, and between the spindle and the frame. The spindle has a longitudinally extending slot communicating with a laterally extending entry opening. The entry opening is configured and dimensioned to accommodate lateral insertion of a folded belt into the spindle slot. Once the belt is thus inserted, the operating arm is employed to wind the belt around the spindle.

When the operating arm is rotated in the "wind" direction, the ratchet mechanisms act in concert to lock the arm to the spindle while allowing the spindle to rotate relative to the frame. When the arm rotates in the opposite "reset" direction, the ratchet mechanisms again act in concert to lock the spindle against rotation relative to the frame while allowing the arm to rotate freely with respect to the spindle.

In addition, a pair of tabs are also provided on the frame. The pair of tabs respectively emanate inwardly from upstanding opposing side walls of the frame to define a longitudinally extending guide track between the pair of tabs and the floor of the frame. The free ends of the pair of tabs are spaced apart from one another to define a laterally extending guide track opening. The additional tabs provide additional control of the belt during the winding and unwinding process.

These and other features and advantages of the present invention will be described in greater detail with reference to the accompanying drawings, wherein:

DETAILED DESCRIPTION OF PREFERRED EMBODIMENTS

Figure 1:
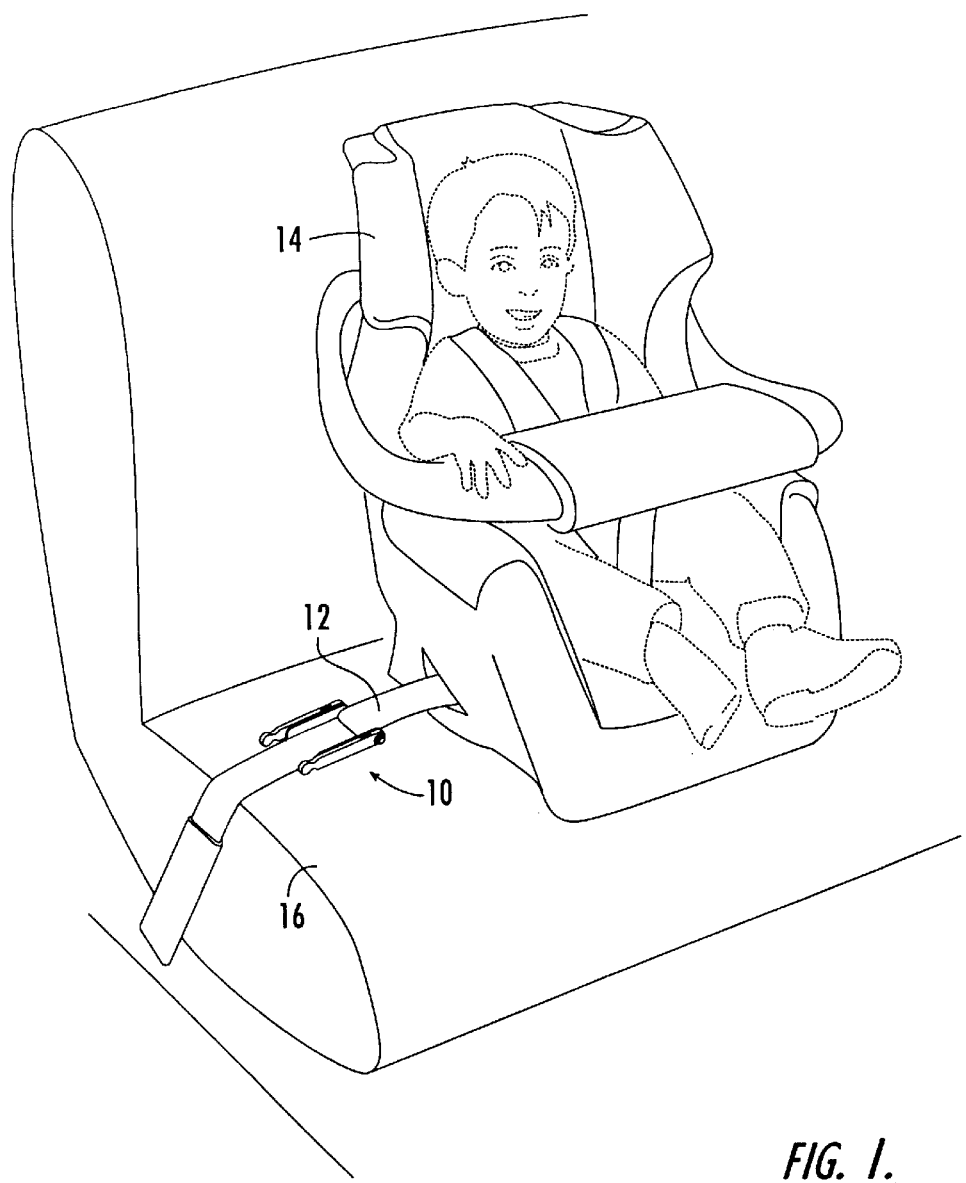
FIG. 1 is a perspective view showing a shortening device in accordance with the present invention applied to an automotive lap seat belt, the latter being used to hold a child's seat in place.
Figure 2:
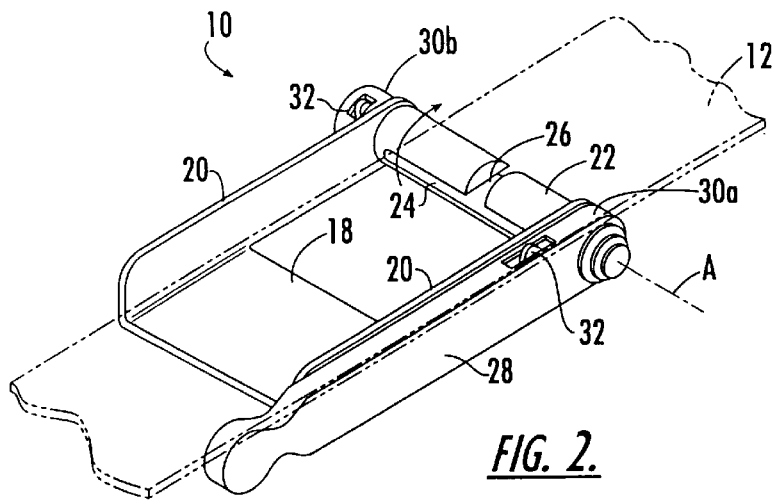
FIG. 2 is a perspective view on an enlarged scale of the shortening device shown in FIG. 1.

Referring initially to FIG. 1, a belt shortening device in accordance with the present invention is shown at 10 applied to an automotive lap seat belt 12. As illustrated, the seat belt 12 is shown in a tightened condition securing a child's seat 14 in place on an automobile seat 16.

Referring additionally to FIGS. 2–7, it will be seen that the shortening device 10 includes a generally channel-shaped frame comprising a bottom wall 18 and parallel opposed side walls 20. A winding spindle 22 extends between and is supported by the side walls 20 for rotation about an axis A. The winding spindle has a longitudinally extending slot 24 communicating with a laterally extending entry opening 26. The width of entry opening 26 is less than the length of slot 24.

An operating handle 28 is connected to the winding spindle 22 by means of a conventional ratchet mechanism 30a mechanically interposed therebetween, and a second ratchet mechanism 30b is mechanically interposed between the spindle 22 and an adjacent frame wall 20. When the arm 28 is operated in the "wind" direction W, ratchet mechanism 30a locks the arm to the spindle 22, and ratchet mechanism 30b allows the spindle to rotate with respect to the frame. When the arm is operated in the opposite reset direction "R", ratchet mechanism 30b locks the spindle to the frame, and ratchet mechanism 30a allows the arm to rotate relative to the spindle. Latches 32 provides a means of reversing the operation of the ratchet mechanisms.

Figure 3:
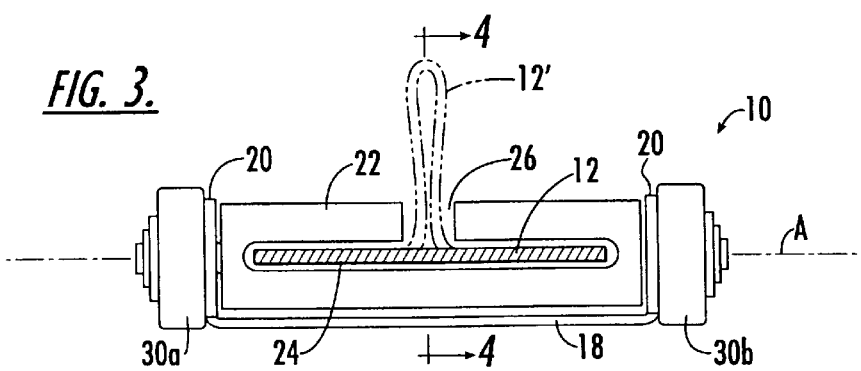
FIG. 3 is an end view of the shortening device taken along line 3—3 of FIG. 2.
Figure 4:
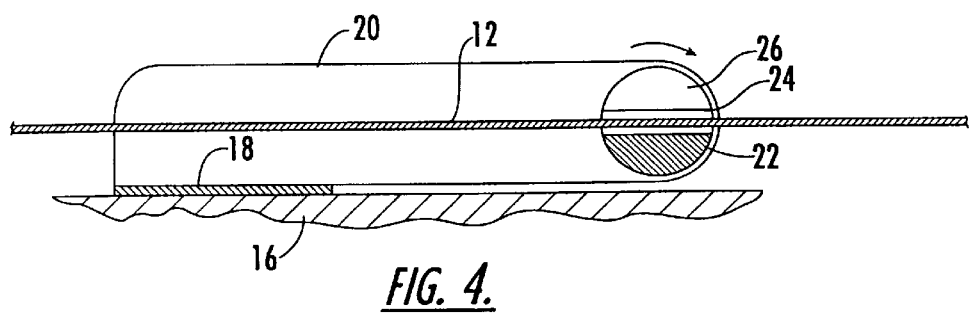
FIG. 4 is a sectional view taken along line 44 of FIG. 3.
Figure 5:
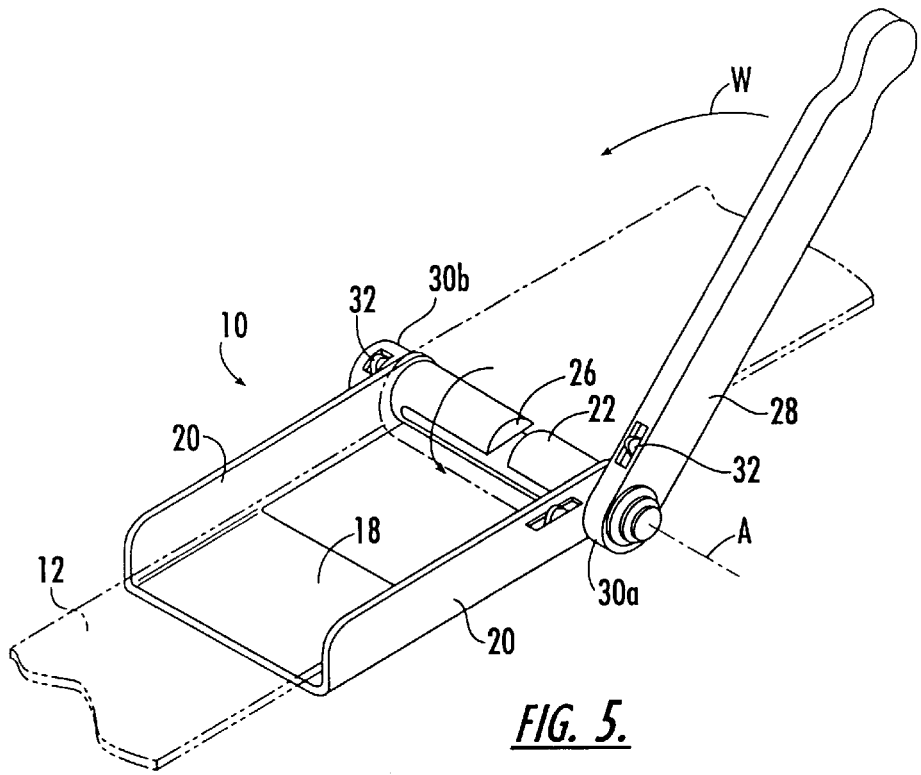
FIG. 5 is a view similar to FIG. 2 showing the shortening device in use.
Figure 6:
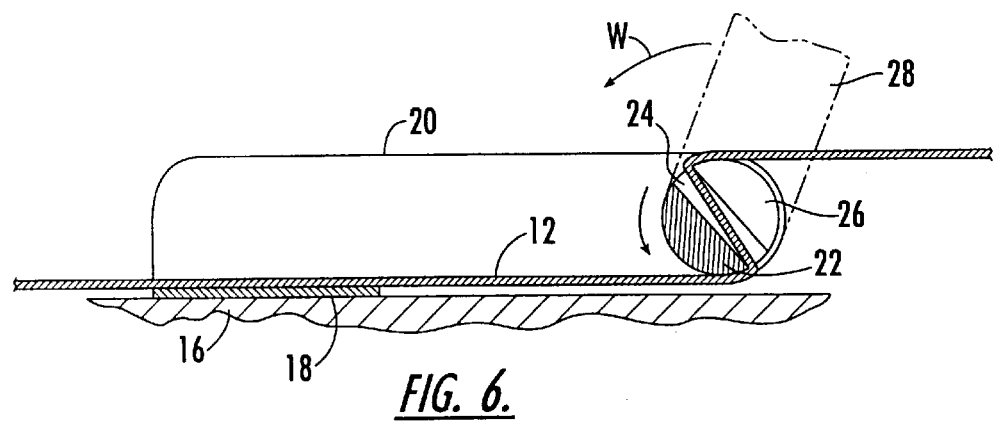
FIGS. 6 and 7 are views similar to FIG. 4 showing the belt being wound on the winding spindle.

In use, a belt 12 or other like strap or flexible element is first folded as indicated by the broken lines at 12' in FIG. 3. The folded belt is inserted into the spindle slot 24 via the entry opening 26. As shown in FIGS. 3 and 4, when the belt is thus inserted, it lies flat in the slot 24 and overlies the bottom wall 18 of the frame. The length of slot 24 is preferably somewhat greater than the belt width.

Figure 7:
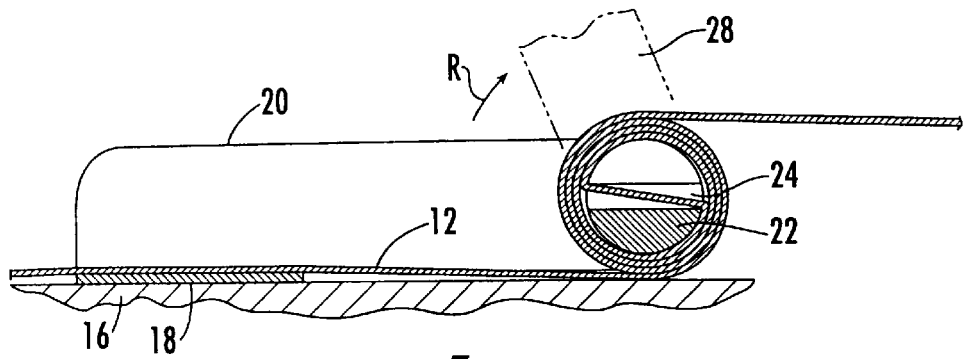

The belt 12 may then be shortened by manipulating the handle 28 to rotate the spindle 22 in the wind direction W. Frame rotation in the same direction W will be prevented by contact of the bottom wall 18 with the seat 16. Frame rotation in the opposite reset direction "R" will be resisted by contact of the bottom wall 18 with the underside of the belt. As shown in FIG. 7, continued manipulation of the handle 28 will cause the belt to wind itself around the spindle 22, thereby shortening the overall belt length and, in the environment depicted in FIG. 1, resulting in the belt being tightened. The belt may be loosened by operating the latches 32 to accommodate reverse operation of the ratchet mechanisms 30a, 30b.

In light of the foregoing, it will now be appreciated by those skilled in the art that various modifications may be made to the embodiment herein chosen for purposes of disclosure. For example, the frame configuration may be altered to include only a single side wall supporting both a cantilevered base and a cantilevered winding spindle. The winding spindle may assume various configurations and cross sections, provided that they all have a belt receiving slot or its equivalent which is accessible by an entry opening through which the belt may be admitted, typically by folding as shown in FIG. 3. Ratchet mechanisms 30a, 30b may be combined as a single unit.

Figure 8:
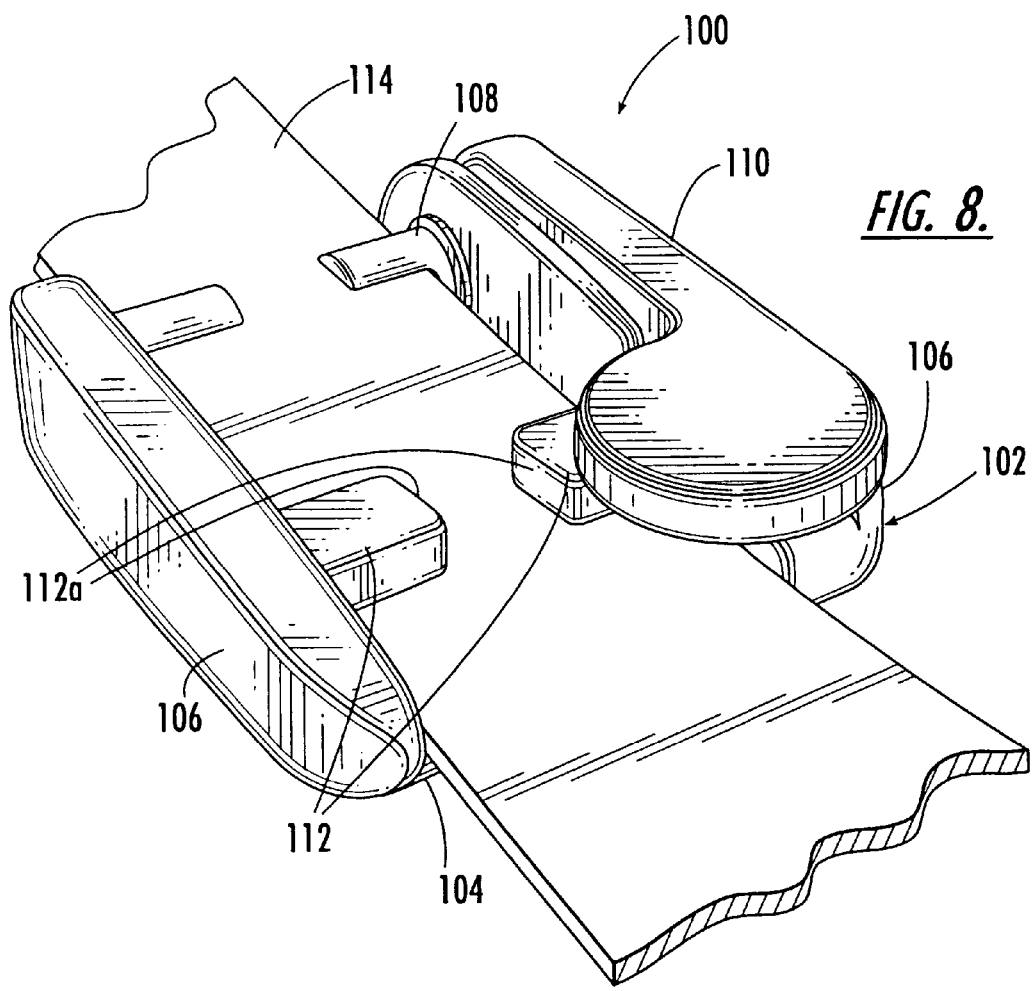
FIG. 8 is a perspective view of an alternative embodiment of the shortening device of the present invention with belt in preparation for winding about the spindle for shortening.
Figure 9:
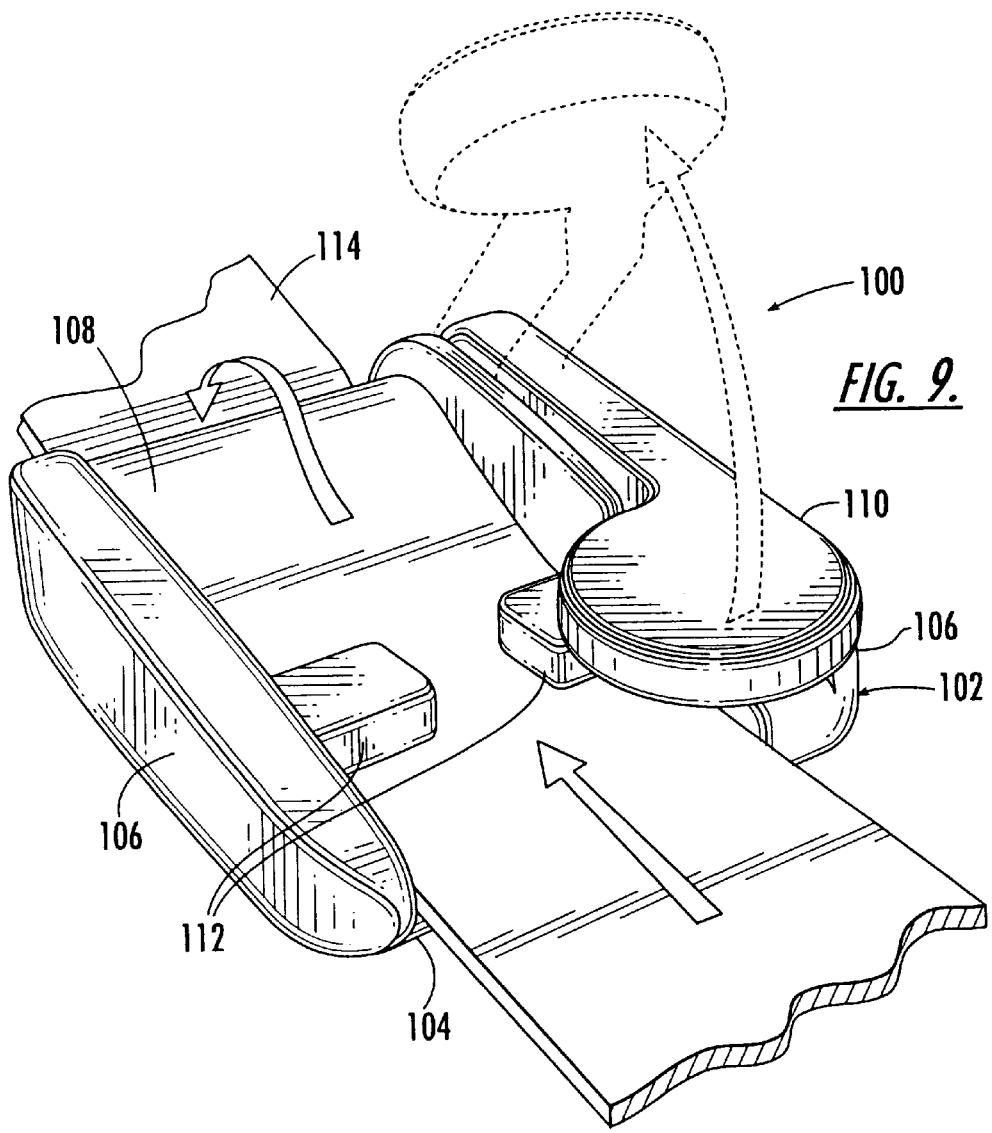
FIG. 9 is a perspective view of the alternative embodiment of FIG. 8 with belt in the process of being wound and shortened by cranking of the handle.
Figure 10:
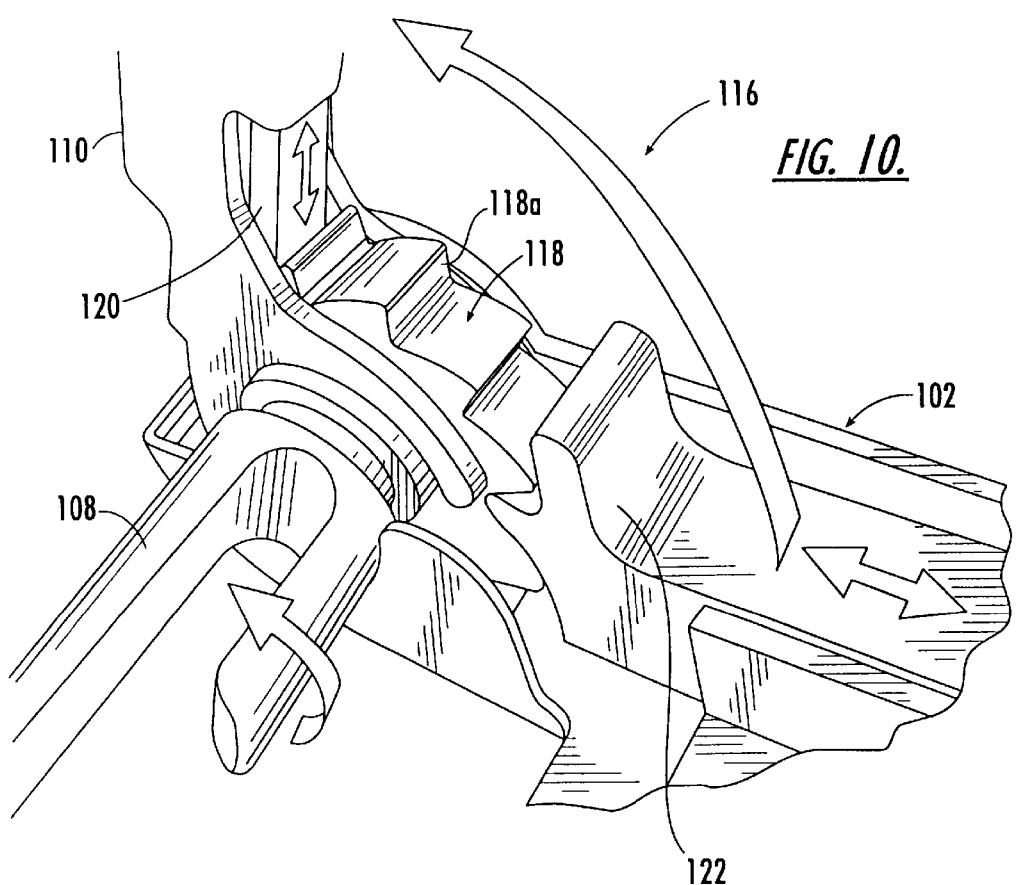
FIG. 10 is a perspective view of the ratchet mechanism of the alternative embodiment shown in FIG. 8.

Turning now to FIGS. 8–10, an alternative embodiment 100 of the present invention is shown. The alternative embodiment 100 includes a frame 102 with a floor 104 and two upstanding walls 106 therefrom. As in the preferred embodiment 10 of the present invention shown in FIGS. 1–7, a spindle 108 is rotatably mounted to the frame 102 as seen in FIGS. 8–10. As will be discussed in detail in connection with FIG. 10, the spindle 108 is controllably rotated by the handle 110 which is cranked by the user. Still referring to FIG. 8, a pair of tabs 112 emanate inwardly from the two upstanding walls 106. These tabs 112 are located above the floor 104 of the frame 102 a selected distance to form and define a longitudinal guide track. The free ends 112a of the tabs 112 are separated from one another to define a lateral entry opening to access the guide track between the tabs 112 and the floor 104 of the frame 102. Essentially, the spindle 108 forms a "T-slot" that is rotatable to wind up the belt 114 residing therein. In the alternative embodiment 100 of the present invention, a second "T-slot" is provided that is stationary to serve as a guide to control and secure the belt 114 during winding. In FIG. 8, the belt 114 is routed into the "T-slot" of spindle 108 and the stationery "T-slot" in similar fashion how the belt is inserted in the preferred embodiment 10. However, in the alternative embodiment 100, the belt 114 is loaded into both the spindle 108 (or rotating T-slot) and between the tabs 112 and the floor 104 of the frame 102 (stationery T-slot). Once the belt 114 is loaded, as in FIG. 8, it is in preparation for winding.

Turning now to FIG. 9, winding and shortening of the belt 114 is shown. Cranking of the handle 110 in an upward direction, as shown by the arrow in dotted lines, causes the spindle 108 (now hidden by wound belt 114) to rotate thus winding the belt 114 therearound. As shown by the indicated arrows, the belt 114 is shortened and wound about the spindle 108. As the belt 114 is wound about the spindle 108, the belt 114 has a tendency to lift out of the frame 102. With the additional tabs 112 of the alternative embodiment 100 of the present invention, the belt 114 is maintained within the frame 102 and proximal to the floor 104 of the frame 102. As a result, during winding, the belt 114 is maintained in control at all times to effectively avoid derailing and jamming of the device 100.

Referring now to FIG. 10, the ratchet mechanism 116 for controlling the rotation of the spindle 108 is shown in detail. In particular, the spindle 108 is affixed directly to a primary gear 118 with teeth 118a thereon. When handle 110 is moved in the direction of the indicated arrow, a rotation pawl 120, which is spring-biased in a downward direction toward the primary gear 118, engages a tooth 118a of the primary gear 118 to cause the primary gear 118, thus the spindle 108, to rotate in the direction indicated by the arrow about the spindle 108. As a result, the belt 114 is wound a partial turn about the spindle 108. For additional winding, the handle 110 is moved downward in a direction opposite the direction of the indicated arrow in preparation for additional winding. When the handle 110 is moved downward, the rotation pawl 120 rides over the teeth 118a of the primary gear 118. To prevent unwinding of the spindle 108, a lock pawl 122, which is spring-biased toward the primary gear 118, is provided which engages with a tooth 118a of the primary gear 118 to prevent rotation of the spindle 108 in an unwinding direction. For a subsequent rotation, the rotation pawl 120 engages another tooth 118a on the primary gear 118 and the lock pawl 122 rides over the teeth 118a until the stroke of the handle 110 is completed. The handle 110 is cranked until the desired winding and shortening of belt 114 is achieved. While this ratchet mechanism 116 is preferred for the alternative embodiment 100 of the present invention, other ratchet mechanisms may be employed. In addition, while two opposing tabs 112 are preferred, a single tab from one of the upstanding walls 106 of the frame 102 or other guide structure may be employed to control and secure the belt 114 during winding.

It is our intention to encompass these and all other changes and modifications to the embodiment herein described which do not depart from the spirit and scope of our invention as defined by the claims appended hereto.

What is claimed is:

1. A device for shortening a length of a flexible belt having a width and opposing edges and a top portion, comprising:

a frame having a upstanding opposing side walls and a floor;

a spindle supported by and between said upstanding opposing side walls of said frame for rotation about an axis, said spindle including a longitudinally extending slot, having a length, a width, a first end and a second end opposite said first end, communicating with a laterally extending entry opening having a width, said entry opening being configured and dimensioned to accommodate lateral insertion of said belt into said slot; said laterally extending entry opening being positioned between said first end and said second end of said slot; said slot and said entry opening in combination, providing an opening in said spindle of a substantially T-shaped configuration; said spindle being rotatable about said axis in one direction and rotatable in an opposite direction thereto;

operating means for rotating said spindle to thereby wind the inserted belt thereon; and at least one tab connected to said frame; said at least one tab being positioned a selected distance from said spindle and being engageable with said top portion of said inserted belt; said at least one tab securing said belt during winding of said inserted belt on said spindle.

2. The device as claimed in claim 1 wherein said operating means includes a transmission element mechanically interposed therebetween.

3. The device as claimed in claim 1 wherein said operating means includes an arm coupled to said spindle by a double ratchet mechanism mechanically interposed therebetween.

4. The device as claimed in claim 3, wherein said double ratchet mechanism locks said arm to said spindle when said handle is rotated in a wind direction and to accommodate rotation of said spindle relative to said frame, and when said handle is rotated in an opposite reset position, to lock said spindle to said frame and to permit rotation of said handle with respect to said spindle.

5. The device as claimed in claim 1 wherein the length of said slot is greater than the width of said belt.

6. The device as claimed in claim 1 wherein the width of said entry opening is less than the width of said slot.

7. The device as claimed in claim 1, wherein said at least one tab is a pair of tabs respectively emanating inwardly from said upstanding opposing side walls of said frame to define a longitudinally extending guide track between said pair of tabs and said floor of said frame; free ends of said pair of tabs, which are not connected to said upstanding opposing side walls, being spaced apart from one another defining a laterally extending guide track opening.

* * * * *